(12) United States Patent
Hong

(10) Patent No.: US 10,330,839 B2
(45) Date of Patent: Jun. 25, 2019

(54) POLARIZING PLATE AND DISPLAY DEVICE INCLUDING THE SAME

(71) Applicant: SAMSUNG SDI CO., LTD., Yongin-si, Gyeonggi-do (KR)

(72) Inventor: Wan Taek Hong, Suwon-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 566 days.

(21) Appl. No.: 15/092,496

(22) Filed: Apr. 6, 2016

(65) Prior Publication Data

US 2016/0349424 A1 Dec. 1, 2016

(30) Foreign Application Priority Data

May 28, 2015 (KR) .................. 10-2015-0074959

(51) Int. Cl.
*G02B 5/30* (2006.01)
*G02B 1/04* (2006.01)
*G02F 1/1335* (2006.01)

(52) U.S. Cl.
CPC ............ *G02B 5/3025* (2013.01); *G02B 1/04* (2013.01); *G02F 1/133528* (2013.01)

(58) Field of Classification Search
CPC .. G02B 5/3083; G02B 27/286; G02B 5/3025; G02B 1/08; G02B 27/26; G02B 27/28;
(Continued)

(56) References Cited

U.S. PATENT DOCUMENTS

2008/0138540 A1* 6/2008 Omatsu .................. B29C 55/06
428/1.1
2008/0259230 A1* 10/2008 Miyakita ............ B29D 11/0073
349/8
(Continued)

FOREIGN PATENT DOCUMENTS

JP 2005-148567 A 6/2005
JP 2007-233215 A 9/2007
(Continued)

OTHER PUBLICATIONS

Taiwan Office action in corresponding Taiwan patent application No. 105112554, Office action dated Dec. 27, 2016 (4 pgs.).

*Primary Examiner* — Collin X Beatty
*Assistant Examiner* — Grant A Gagnon
(74) *Attorney, Agent, or Firm* — Lewis Roca Rothgerber Christie LLP

(57) ABSTRACT

A polarizing plate includes: a bonding layer; a polarizer on a first surface of the bonding layer; and a polarizer protective film on a second surface of the bonding layer, and a ratio ($\beta_1/\alpha_3$) of a measured tensile modulus ($\beta_1$), in a transverse direction (TD), of the polarizing plate to a sum ($\alpha_3$) of a measured thickness ($\alpha_1$) of the polarizer and a measured thickness ($\alpha_2$) of the polarizer protective film is greater than 0.27 and less than 0.50, and a ratio ($\beta_2/\beta_3$) of a measured tensile modulus ($\beta_2$), in the TD, of the polarizer to a measured tensile modulus ($\beta_3$), in the TD, of the polarizer protective film is greater than 0 and less than 0.2.

18 Claims, 2 Drawing Sheets

(58) Field of Classification Search
CPC ...... G02B 5/3058; G02B 1/04; G02B 27/281;
G02B 5/3016; G02B 5/3075; G02B 1/02;
G02B 5/1809; G02B 21/0092; G02B
5/3041; G02B 1/06; G02B 1/115; G02B
26/105; G02B 27/2214; G02B 27/283;
G02B 27/288; G02B 27/48; G02B 5/00;
G02B 5/30; G02B 5/3066; G02B 5/32;
G02B 6/305; G02B 6/32; G02B 6/34;
G02B 6/4208; G02B 6/4214; G02B 6/43;
G02B 7/008; G02B 13/001; G02B
13/0045; G02B 13/143; G02B 17/08;
G02B 17/0892; G02B 19/0028; G02B
19/0033; G02B 1/041; G02B 1/10; G02B
1/11; G02B 1/12; G02B 21/0016; G02B
21/0032; G02B 21/0056; G02B 21/0068;
G02B 21/14; G02B 2207/117; G02B
23/00; G02B 23/12; G02B 26/001; G02B
26/008; G02B 27/0025; G02B 27/0927;
G02B 27/095; G02B 27/0988; G02B
27/1006; G02B 27/1033; G02B 27/108;
G02B 27/141; G02B 27/285; G02B
27/60; G02B 27/642; G02B 3/0056;
G02B 5/003; G02B 5/008; G02B 5/0252;
G02B 5/0263; G02B 5/0278; G02B 5/04;
G02B 5/18; G02B 5/201; G02B 5/28;
G02B 5/284; G02B 5/285; G02B 5/288;
G02B 5/3008; G02B 5/305; G02B
6/2713; G02B 6/272; G02B 6/2726;
G02B 6/276; G02B 6/2766; G02B
6/4246; G02B 9/34; G03F 7/70566; G03F
7/70191; G03F 7/70091; G03F 7/70116;
G03F 7/70341; G03F 7/70058; G03F
7/20; G03F 7/70075; G03F 7/70108;
G03F 7/70141; G03F 7/702; G03F
7/2045; G03F 7/701; G03F 7/70125;
G03F 7/70158; G03F 7/70216; G03F
7/70308; G03F 7/70966; G02F 1/0136;
G02F 1/0147; G02F 1/13363; G02F
1/133528; G02F 2001/133638; G02F
2413/02; G02F 2413/07; G02F 2413/09;
G02F 1/0063; G02F 1/009; G02F 1/0102;
G02F 1/093; G02F 1/133504; G02F
1/133536; G02F 1/13362; G02F
1/133634; G02F 1/133636; G02F
1/13471; G02F 1/19; G02F 1/3558; G02F
2001/133543; G02F 2001/133548; G02F
2001/133633; G02F 2001/133637; G02F
2201/16; G02F 2202/20; G02F 2202/36;
G02F 2203/21; G02F 2203/60; H04N
13/337; H04N 13/31; H04N 1/193; H04N
13/0418; H04N 13/211; H04N 13/305;
H04N 13/341; H04N 13/356; H04N
13/359; H04N 1/0044; H04N 1/00458;
H04N 1/00461; H04N 1/00572; H04N
1/00578; H04N 1/00657; H04N 1/00705;
H04N 1/00745; H04N 1/00782; H04N
1/03; H04N 1/0305; H04N 1/1017; H04N
1/12; H04N 1/2112; H04N 1/41; H04N
2101/00; H04N 2201/0081; H04N
2201/0246; H04N 2201/02479; H04N
2201/02495; H04N 2213/001; G03H
1/041; G03H 1/0443; G03H 1/0866;
G03H 1/12; G03H 2001/0447; G03H
2001/0452; G03H 2001/0458; G03H
2001/0469; G03H 2001/0471; G03H
2001/0875; G03H 2001/303; G03H
2222/34; G03H 2222/42; G03H 2222/45;
G03H 2223/13; G03H 2223/15; G03H
2223/19; G03H 2225/35; G03H 1/08;
G03H 1/0891; G03H 2001/267
USPC .......................................................... 359/489
See application file for complete search history.

(56) References Cited

U.S. PATENT DOCUMENTS

| | | | |
|---|---|---|---|
| 2009/0053496 | A1* | 2/2009 | Arita ................ B05D 1/62 428/220 |
| 2010/0055355 | A1* | 3/2010 | Hayashi ............ C08J 5/18 428/1.31 |
| 2011/0151145 | A1* | 6/2011 | Kamohara ......... C08B 3/00 428/1.33 |
| 2013/0050614 | A1* | 2/2013 | Inoue ................ G02B 5/3025 349/62 |

FOREIGN PATENT DOCUMENTS

| | | |
|---|---|---|
| JP | 2010-161764 A | 7/2010 |
| JP | 2012-145645 A | 8/2012 |
| JP | 2013-072951 A | 4/2013 |
| JP | 5-324316 | 7/2013 |
| JP | 5-636134 | 10/2014 |
| KR | 20130074665 A | 7/2013 |
| KR | 20150026062 A | 3/2015 |
| KR | 20150027684 A | 3/2015 |
| TW | 200905315 A | 2/2009 |
| TW | 201333548 A | 8/2013 |
| TW | 201445175 A | 12/2014 |
| TW | 201446511 A | 12/2014 |
| TW | 201447402 A | 12/2014 |

* cited by examiner

POLARIZING PLATE AND DISPLAY DEVICE INCLUDING THE SAME

CROSS REFERENCE TO RELATED APPLICATION

This application claims priority to and the benefit of Korean Patent Application No. 10-2015-0074959, filed on May 28, 2015 in the Korean Intellectual Property Office, the entire content of which is incorporated herein by reference.

BACKGROUND

1. Field

Aspects of embodiments of the present invention relate to a polarizing plate and a display device including the same.

2. Description of the Related Art

A polarizing plate generally includes a polarizer, which performs a polarization function, and a polarizer protective film, which is laminated on one or both surfaces of the polarizer to protect the polarizer. A triacetyl cellulose (TAC) film is generally used as the polarizer protective film.

Many endurance test results show that a crack phenomenon in a stretching direction, which is caused by the contraction and expansion of the polarizer, is more apparent in a one-sheet-type polarizing plate in which the TAC film is laminated on one surface of the polarizer than in a two-sheet-type polarizing plate in which the TAC film is laminated on both surfaces of the polarizer.

SUMMARY

According to an aspect of embodiments of the present invention, a one-sheet-type polarizing plate is capable of improving a crack phenomenon in a stretching direction.

According to another aspect of embodiments of the present invention, a display device has improved polarization characteristics.

The above and other aspects of the present invention will become more apparent to one of ordinary skill in the art to which the invention pertains by referencing the description with regard to some exemplary embodiments of the invention set forth below.

According to one or more embodiments of the present invention, a polarizing plate includes: a bonding layer a polarizer on a first surface of the bonding layer and a polarizer protective film on a second surface of the bonding layer, and a ratio ($\beta_1/\alpha_3$) of a measured tensile modulus ($\beta_1$), in a transverse direction (TD), of the polarizing plate to a sum ($\alpha_3$) of a measured thickness ($\alpha_1$) of the polarizer and a measured thickness ($\alpha_2$) of the polarizer protective film is greater than 0.27 and less than 0.50, and a ratio ($\beta_2/\beta_3$) of a measured tensile modulus ($\beta_2$), in the TD, of the polarizer to a measured tensile modulus ($\beta_3$), in the TD, of the polarizer protective film is greater than 0 and less than 0.2.

The polarizer may be a polyvinyl alcohol (PVA)-based film dyed with iodine or a dichroic dye. The polarizer protective film may have an in-plane retardation (Re) from 10,100 nm to 15,500 nm. The polarizer protective film may have a value of Nz from 1.5 to 1.7. The in-plane retardation (Re) and the value of Nz of the polarizer protective film are calculated by Equations (1) and (3), respectively:

$$Re=(nx-ny)\times d \quad (1); \text{and}$$

$$Nz=(nx-nz)/(nx-ny) \quad (3),$$

where nx, ny, and nz denote a refractive index, in an x-axis direction, a refractive index, in a y-axis direction, and a refractive index, in a z-axis direction, respectively, of the polarizer protective film at a wavelength of 550 nm, d denotes a thickness of the polarizer protective film, and the x-axis direction, the y-axis direction, and the z-axis direction are a widthwise direction, a lengthwise direction, and a thickness direction, respectively, of the polarizer protective film.

The polarizer protective film may have a value of (nx−ny) from 0.1 to 0.2.

The polarizer protective film may be a polyethylene terephthalate (PET)-based film.

The polarizer protective film may comprise a base film, and a primer layer on one or both surfaces of the base film.

The primer layer may have a transmissivity of 90% or higher at a wavelength of 550 nm. A ratio (B/A) of a refractive index (B) of the primer layer to a refractive index (A) of the base film may be from 0.69 to 0.95.

The refractive index (A) of the base film may be from 1.3 to 1.7.

The refractive index (B) of the primer layer may be from 1.0 to 1.6.

A thickness of the primer layer may be from 1 nm to 200 nm.

The primer layer may comprise a compound of at least one of polyester and an acrylic resin.

The base film may have a ratio (Rth/Re) of a retardation in thickness direction (Rth) to an in-plane retardation (Re) at the wavelength of 550 nm of 1.3 or less. The in-plane retardation (Re) and the retardation in thickness direction (Rth) of the base film are calculated by Equations (1) and (2), respectively:

$$Re=(nx-ny)\times d \quad (1); \text{and}$$

$$Rth=((nx+ny)/2-nz)\times d \quad (2),$$

where nx, ny, and nz denote a refractive index, in an x-axis direction, a refractive index, in a y-axis direction, and a refractive index, in a z-axis direction, respectively, of the base film at the wavelength of 550 nm, d denotes a thickness of the base film, and the x-axis direction, the y-axis direction, and the z-axis direction are a widthwise direction, a lengthwise direction, and a thickness direction, respectively, of the base film.

The base film may have an in-plane retardation (Re) from 10,100 nm to 15,500 nm.

The base film may have a value of Nz from 1.5 to 1.7.

The in-plane retardation (Re) and the value of Nz of the base film are calculated by Equations (1) and (3), respectively:

$$Re=(nx-ny)\times d \quad (1); \text{and}$$

$$Nz=(nx-nz)/(nx-ny) \quad (3),$$

where nx, ny, and nz denote a refractive index, in an x-axis direction, a refractive index, in a y-axis direction, and a refractive index, in a z-axis direction, respectively, of the base film at the wavelength of 550 nm, d denotes a thickness of the base film, and the x-axis direction, the y-axis direction, and the z-axis direction are a widthwise direction, a lengthwise direction, and a thickness direction, respectively, of the base film.

A water vapor transmission rate (WVTR) of the polarizer protective film at a temperature of 40° C. and a relative humidity of 90% may be from 1 g/m²·day to 100 g/m²·day.

The WVTR may be from 1 g/m²·day to 10 g/m²·day.

The measured tensile modulus ($\beta_2$), in the TD, of the polarizer may be from of 1 MPa to 5 MPa.

The measured tensile modulus ($\beta_3$), in the TD, of the polarizer protective film may be not less than 30 MPa and less than 100 MPa.

The polarizing plate may further comprise an adhesive layer, and the polarizer may be between the adhesive layer and the bonding layer.

According to one or more embodiments of the present invention, a display device includes a display panel and the above-described polarizing plate, the polarizing plate being arranged on a surface of the display panel. The display device may further include another of the above-described polarizing plate, the another polarizing plate being arranged on another surface of the display panel. The display panel may include a liquid crystal display (LCD) panel including a liquid crystal layer between transparent substrates.

According to an aspect of the above-described embodiments of the present invention, a crack phenomenon in a stretching direction may be improved.

Also, the polarization characteristics of a display device may be improved.

Other features and aspects of the present invention will be apparent from the following description, the drawings, and the claims.

BRIEF DESCRIPTION OF THE DRAWINGS

The accompanying drawings, which are included to provide a further understanding of aspects of the invention, and are incorporated in and constitute a part of this specification, illustrate some exemplary embodiments of the invention, and, together with the description, serve to explain principles of the invention.

DETAILED DESCRIPTION OF THE EMBODIMENTS

Figure 1:
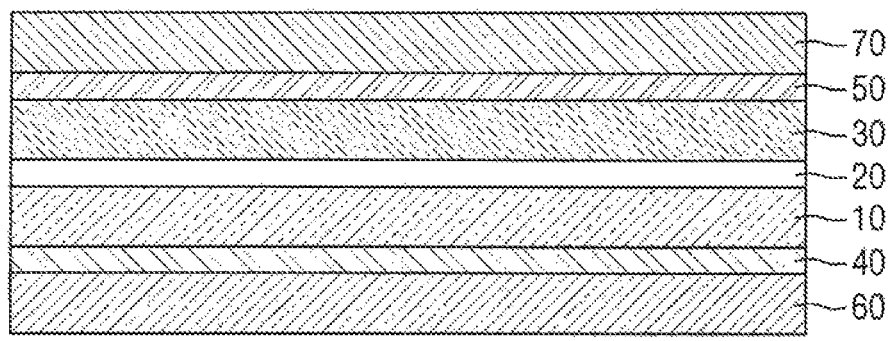
FIG. 1 is a schematic cross-sectional view of a polarizing plate according to an exemplary embodiment of the invention.

In the following description, for the purpose of explanation, numerous details are set forth in order to provide a thorough understanding of some exemplary embodiments. It is apparent, however, that various exemplary embodiments may be practiced without these specific details or with one or more equivalent arrangements. In some instances, well-known structures and devices may be shown in block diagram form in order to avoid unnecessarily obscuring aspects of some exemplary embodiments of the invention.

In the accompanying figures, the size and relative sizes of layers, films, panels, regions, etc., may be exaggerated for clarity and descriptive purposes. Also, like reference numerals denote like elements.

When an element or layer is referred to as being "on," "connected to," or "coupled to" another element or layer, it may be directly on, connected to, or coupled to the other element or layer, or intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms "first," "second," etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting of the present invention. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

Some exemplary embodiments are described below with reference to the accompanying drawings.

FIG. 1 is a schematic cross-sectional view of a polarizing plate according to an exemplary embodiment of the invention. Referring to FIG. 1, a polarizing plate 100 may include a polarizer 10, a bonding layer 20, a first polarizer protective film 30, and a first adhesive layer 40. The polarizing plate 100 includes only one first polarizer protective film 30.

The ratio of a measured tensile modulus $\beta_1$, in a transverse direction (TD), of the polarizing plate 100 to a sum $\alpha_3$ of a measured thickness at of the polarizer 10 and a measured thickness $\alpha_2$ of the first polarizer protective film 30, i.e. $\beta_1/\alpha_3$, is greater than 0.27 and less than 0.50. The ratio of a measured tensile modulus $\beta_2$, in the TD, of the polarizer 10 to a measured tensile modulus $\beta_3$, in the TD, of the first polarizer protective film 30, i.e. $\beta_2/\beta_3$, is greater than 0 and less than 0.2.

The polarizer 10 transforms natural light or polarized light into arbitrary polarized light, and any polarizer that is of common use in the fabrication of a polarizing plate may be used as the polarizer 10 without restriction.

The bonding layer 20 is provided on one surface of the polarizer 10 and bonds the first polarizer protective film 30 and the polarizer 10 together. That is, the polarizer 10 may be provided on one surface of the bonding layer 20, and the first polarizer protective film 30 may be provided on the other surface of the bonding layer 20. The bonding layer 20 may be formed of a typical adhesive such as, for example, a water-based adhesive, a solventless adhesive, or a pressure-sensitive adhesive.

The first polarizer protective film 30 may protect the polarizer 10. The first polarizer protective film 30 may be a uniaxially stretched transparent polymer film. Due to its increased crystallinity, the uniaxially stretched transparent polymer film may increase the modulus and the toughness of the polarizer 10 and may thus provide the benefit of improving the surface hardness of the polarizer 10.

Figure 3:
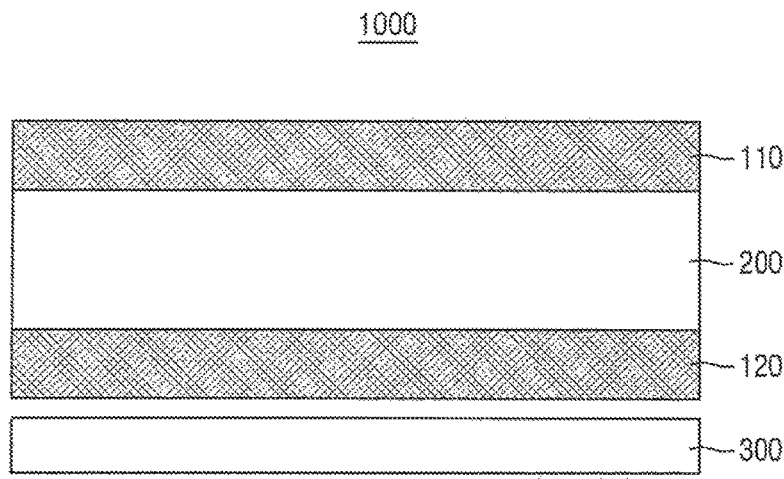
FIG. 3 is a schematic cross-sectional view of a display device according to another exemplary embodiment of the invention.

The first adhesive layer 40 may couple or attach the polarizing plate 100 to one or both surfaces of a display panel (e.g., a display panel 200 of FIG. 3) of a display device (e.g., a display device 1000 of FIG. 3). The polarizer 10 may be disposed between the bonding layer 20 and the first adhesive layer 40.

The polarizing plate 100 may also include a release film 60, which is coupled onto the first adhesive layer 40. The release film 60 may be eliminated or removed before the coupling (or attaching) of the polarizing plate 100 to the display panel.

The polarizing plate 100 may also include a second adhesive layer 50 and a polarizing plate protective film 70. The first polarizer protective film 30 may be disposed between the bonding layer 20 and the second adhesive layer 50, and the second adhesive layer 50 may be disposed between the first polarizer protective film 30 and the polarizing plate protective film 70. The second adhesive layer 50 and the polarizing plate protective film 70 may be eliminated or removed before the coupling (or attaching) of the polarizing plate 100 to the display panel.

The thickness of the polarizer 10 may be from 2 µm to 60 µm. The thickness of the first polarizer protective film 30 may be from 60 µm to 120 µm. By satisfying the aforementioned thickness ranges of the polarizer 10 and the first polarizer protective film 30 and controlling the ratio $\beta_1/\alpha_3$ to be greater than 0.27 and less than 0.50, a crack phenomenon, in a machine direction (MD), of the polarizer 10 may be improved.

The measured tensile modulus $\beta_2$, in the TD, of the polarizer 10 may be from 1 MPa to 5 MPa. The measured tensile modulus $\beta_3$, in the TD, of the first polarizer protective film 30 may be from 30 MPa to 100 MPa. By satisfying the aforementioned tensile modulus ranges of the polarizer 10 and the first polarizer protective film 30 and controlling the ratio $\beta_2/\beta_3$ to be greater than 0 and less than 0.2, a crack phenomenon, in the MD, of the polarizer 10 may be improved.

The measured tensile modulus $\beta_1$, in the TD, of the polarizing plate 100 may be from 31 MPa to 105 MPa.

The polarizer 10 may be, for example, a polyvinyl alcohol (PVA)-based film dyed with iodine or a dichroic dye. The polarizer 10 may be fabricated by dyeing the PVA-based film with iodine or a dichroic dye and stretching the PVA-based film in a particular direction. In one embodiment, the fabrication of the polarizer 10 may involve a swelling step, a dyeing step, and a stretching step. The swelling step, the dyeing step, and the stretching step are already well known in the art to which the invention pertains, and thus, detailed descriptions thereof will be omitted.

For example, the PVA-based film may be a non-modified, bare PVA film or a modified PVA film such as a partially formylated PVA film or an acetoacetyl group-modified PVA film.

In one embodiment, the polymerization degree of the PVA-based film may be from 1,700 to 4,000, and, in this range, the PVA-based film may properly serve as a polarizing member.

An adhesive used to form the bonding layer 20 may be appropriately selected. For example, in a case in which the PVA-based film, which has high hygroscopicity, is used as the polarizer 10, the quality of display, and the durability, of the polarizing plate 100 may be degraded. The first polarizer protective film 30, which has low moisture permeability, may compensate the PVA-based film's weakness against water.

However, if a water-based adhesive is used to form the bonding layer 20 when in the first polarizer protective film 30, which has low water permeability, is used, water generated during the fabrication of the polarizing plate 100 may not be able to be properly evaporated and may thus degrade the durability of the polarizing plate 100. In this case, a solventless adhesive may preferably be used to form the bonding layer 20.

For example, the solventless adhesive may comprise a curing agent and at least one curing component selected from among a urethane-based polymer, a (meth)acrylate-based polymer, a urethane-based polymer, an epoxy-based polymer, an epoxy (meth)acrylate-based polymer, a urethane (meth)acrylate-based polymer and a combination thereof.

The curing component may be contained from 90 wt % to 99 wt %, and the curing agent may be contained from 1 wt % to 10 wt %.

For example, the curing component may be a (meth)acrylate-based monomer having a vinyl group, and the (meth)acrylate-based monomer having a vinyl group may be (meth)acrylate having a linear or branched alkyl group having 1 to 15 carbon atoms, (meth)acrylate having an alicyclic group having 5 to 15 carbon atoms, (meth)acrylate having an aryl group having 6 to 20 carbon atoms, (meth)acrylate having an aralkyl group having 7 to 20 carbon atoms, or a combination thereof. More specifically, the (meth)acrylate-based monomer having a vinyl group may be, but is not limited to, methyl (meth)acrylate, n-butyl (meth)acrylate, isobutyl (meth)acrylate, neopentyl (meth)acrylate, lauryl (meth)acrylate, cyclohexyl (meth)acrylate, phenyl (meth)acrylate, or benzyl (meth)acrylate.

The curing agent may be a photo curing agent or a thermal curing agent. For example, the curing agent may comprise, but is not limited to, at least one of an isocyanate-based curing agent, acetophenone, benzoin, benzophenone, diethoxy acetophenone, phenyletone, thioxanthone, 2-hydroxy-2-methyl-1-phenylpropan-1-one, 4-(2-hydroxy ethoxy)phenyl-(2-hydroxy)-2-propyl ketone, 1-hydroxycyclohexyl phenyl ketone, methyl-o-benzoylbenzoate, 4-phenyl benzophenone, 4-benzoyl-4'-methyl-diphenyl sulfide, (4-benzoyl-benzyl) trimethylammonium chloride, bis(2,4,6- trimethylbenzoyl)-phenyl phosphine oxide, diphenyl(2,4,6-trimethylbenzoyl)phosphine oxide, 2-hydroxy methyl propionitrile, 2,2'-{azobis(2-methyl-N-[1,1'-bis(hydroxymethyl)-2-hydroxyethyl) propionamide], acrylate [(2-methoxy-2-phenyl-2-benzoyl)-ethyl] ester, phenyl 2-acryloyloxy-2-propyl ketone, phenyl 2-methacryloyloxy-2-propyl ketone, 4-isopropylphenyl 2-acryloyloxy-2-propyl ketone, 4-chlorophenyl 2-acryloyloxy-2-propyl ketone, 4-dodecylphenyl 2-acryloyloxy-2-propyl ketone, 4-methoxyphenyl 2-acryloyloxy-2-propyl ketone, 4-acryloyloxyphenyl 2-hydroxy-2-propyl ketone, 4-methacryloyloxy 2-hydroxy-2-propyl ketone, 4-(2-acryloyloxyethoxy)-phenyl 2-hydroxy-2-propyl ketone, 4-(2-acryloyloxydiethoxy)-phenyl 2-hydroxy-2-propyl ketone, 4-(2-acryloyloxyethoxy)-benzoin, 4-(2-acryloyloxyethyl-thio)-phenyl 2-hydroxy-2-propyl ketone, 4-N,N'-bis-(2-acryloyloxyethyl)-aminophenyl 2-hydroxy-2-propyl ketone, 4-acryloyloxyphenyl 2-acryloyloxy-2-propyl ketone, 4-methacryloyloxyphenyl 2-methacryloyloxy-2-propyl ketone, 4-(2-acryloyloxyethoxy)-phenyl 2-acryloyloxy-2-propyl ketone, 4-(2-acryloyloxydiethoxy)-phenyl 2-acryloyloxy-2-propyl ketone, dibenzyl ketone, benzoin alkyl ether, benzoin methyl ether, benzoin ethyl ether, benzoin isopropyl ether, benzoin isobutyl ether, dialkyl acetophenone, hydroxyl alkylketone, phenyl glyoxylate, benzyl dimethyl ketal, acyl phosphine, and α-aminoketone.

The first polarizer protective film 30 may include a polyester-based polymer film, an acrylic-based polymer film, or an olefin-based polymer film. However, the first polarizer protective film 30 may not include any cellulose-based film such as a triacetyl cellulose (TAC) film. The first polarizer protective film 30 may be, but is not limited to, a polyethylene terephthalate (PET)-based film or a polyethylene naphthalate (PEN)-based film.

The first polarizer protective film 30 may be an ultra-high retardation film. In one embodiment, an in-plane retardation Re, at a wavelength of 550 nm, of the first polarizer protective film 30 may be greater than 10,000 nm, and, in one embodiment, is from 10,100 nm to 50,000 nm, and, in one embodiment, is from 10,100 nm to 15,500 nm.

In these in-plane retardation ranges, the first polarizer protective film 30 does not generate any rainbow stains and prevents or substantially prevents a light leakage phenomenon (such as the leakage of light from the sides of the polarizing plate 100) or the change of a phase difference value according to the incident angle, and minimizes or reduces the change of a phase difference according to the wavelength.

The in-plane retardation Re may be calculated by Equation (1):

$$Re = (nx - ny) \times d \quad (1).$$

The first polarizer protective film 30 may have a value of (nx−ny) from 0.1 to 0.2. In this range, a phase difference depending on the incidence angle and the wavelength may be only slightly changed in the first polarizer protective film 30, and thus the first polarizer protective film 30 may prevent, or at least minimize or reduce, rainbow stains.

The first polarizer protective film 30 may have a retardation in thickness direction Rth, which is in a particular range. The retardation in thickness direction Rth may be 15,000 nm or less at a wavelength of 550 nm. In one embodiment, the thickness-direction retardation Rth may be from 10,000 nm to 12,000 nm. The thickness-direction retardation Rth may be calculated by Equation (2):

$$Rth = ((nx + ny)/2 - nz) \times d \quad (2).$$

The ratio of the thickness-direction retardation Rth to the in-plane retardation Re, i.e. Rth/Re, may be 1.3 or less.

The first polarizer protective film 30 may have an in-plane retardation Re from 10,100 nm to 15,500 nm at a wavelength of 550 nm, and a value of Nz from 1.5 to 1.7. The value of Nz may be calculated by Equation (3):

$$Nz = (nx - nz)/(nx - ny) \quad (3).$$

Referring to Equations (1) through (3), nx, ny, and nz denote the refractive index, in an x-axis direction (i.e. a widthwise direction), the refractive index, in a y-axis direction (i.e. a lengthwise direction), and the refractive index, in a z-axis direction (i.e. a thickness direction), respectively, of the first polarizer protective film 30 at a wavelength of 550 nm, and d denotes the thickness of the first polarizer protective film 30.

A water vapor transmission rate (WVTR) of the first polarizer protective film 30 at a temperature of 40° C. and a relative humidity of 90% may be from 1 g/m²·day to 100 g/m²·day. In one embodiment, the WVTR of the first polarizer protective film 30 may be from of 1 g/m²·day to 10 g/m²·day.

Figure 2:
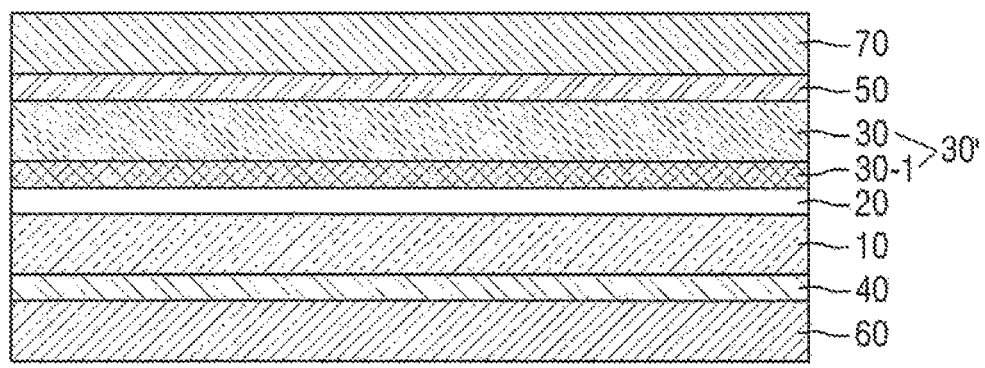
FIG. 2 is a schematic cross-sectional view of a polarizing plate according to another exemplary embodiment of the invention.

FIG. 2 is a schematic cross-sectional view of a polarizing plate according to another exemplary embodiment of the invention. Referring to FIG. 2, a polarizing plate 100-1 may include the polarizer 10, the bonding layer 20, the first polarizer protective film 30, a primer layer 30-1, the first adhesive layer 40, the second adhesive layer 50, the release film 60, and the polarizing plate protective film 70.

The polarizer 10, the bonding layer 20, the first polarizer protective film 30, the first adhesive layer 40, the second adhesive layer 50, the release film 60, and the polarizing plate protective film 70 are as already described above in the description of the polarizing plate 100.

The polarizing plate 100-1 differs from the polarizing plate 100 of FIG. 1 in that it further includes the primer layer 30-1. More specifically, a second polarizer protective film 30' of the polarizing plate 100-1 differs from the first polarizer protective film 30 of the polarizing plate 100 of FIG. 1 in that the primer layer 30-1 is disposed on one or both surfaces of the first polarizer protective film 30 of the second polarizer protective film 30'.

Referring to FIG. 2, the primer layer 30-1 may be disposed between the first polarizer protective film 30 and the bonding layer 20, but the invention is not limited thereto. That is, the primer layer 30-1 may also be disposed between the first polarizer protective film 30 and the second adhesive layer 50.

The second polarizer protective film 30' may use the first polarizer protective film 30 as a base film. The refractive index of the first polarizer protective film 30 may be from 1.3 to 1.7, and, in one embodiment, is from 1.4 to 1.6. In these ranges, the first polarizer protective film 30 may improve the transmissivity of the second polarizer protective film 30' through the control of the refractive index of the primer layer 30-1.

The refractive index of the primer layer 30-1 may be lower than, or equal to, the refractive index of the first polarizer protective film 30. In one embodiment, the refractive index of the primer layer 30-1 may be from 1.0 to 1.6, and, in one embodiment, is from 1.1 to 1.6, and, in one embodiment, is from 1.1 to 1.5. In these ranges, the primer layer 30-1 may further improve the transmissivity of the second polarizer protective film 30'.

The ratio of a refractive index B of the primer layer 30-1 to a refractive index A of the first polarizer protective film 30, i.e. B/A, may be from 0.69 to 0.95. The transmissivity of the second polarizer protective film 30' may be 90% or higher at a wavelength of 550 nm. The refractive indexes A and B are both measurements obtained at the wavelength of 550 nm using the Abbe refractometer.

The thickness of the primer layer 30-1 may be from of 1 nm to 200 nm, and, in one embodiment, is from 60 nm to 200 nm. In these ranges, the primer layer 30-1 may have an appropriate refractive index compared to the first polarizer protective film 30 and may thus improve the transmissivity of the second polarizer protective film 30'.

The material of the primer layer 30-1 is not particularly limited as long as it allows the primer layer 30-1 to satisfy the aforementioned thickness and refractive index ranges of the primer layer 30-1. For example, the primer layer 30-1 may be a non-urethane-based primer layer 30-1 containing no urethane group and may comprise at least one of, for example, a polyester-based resin and an acrylic-based resin. For example, the primer layer 30-1 may be formed of a composition comprising a polyester-based resin and an acrylic-based resin, in which case, the aforementioned refractive index range of the primer layer 30-1 can be provided through the control of the composition ratio (for example, the molar ratio) of the polyester-based resin and the acrylic-based resin.

Figure 4:
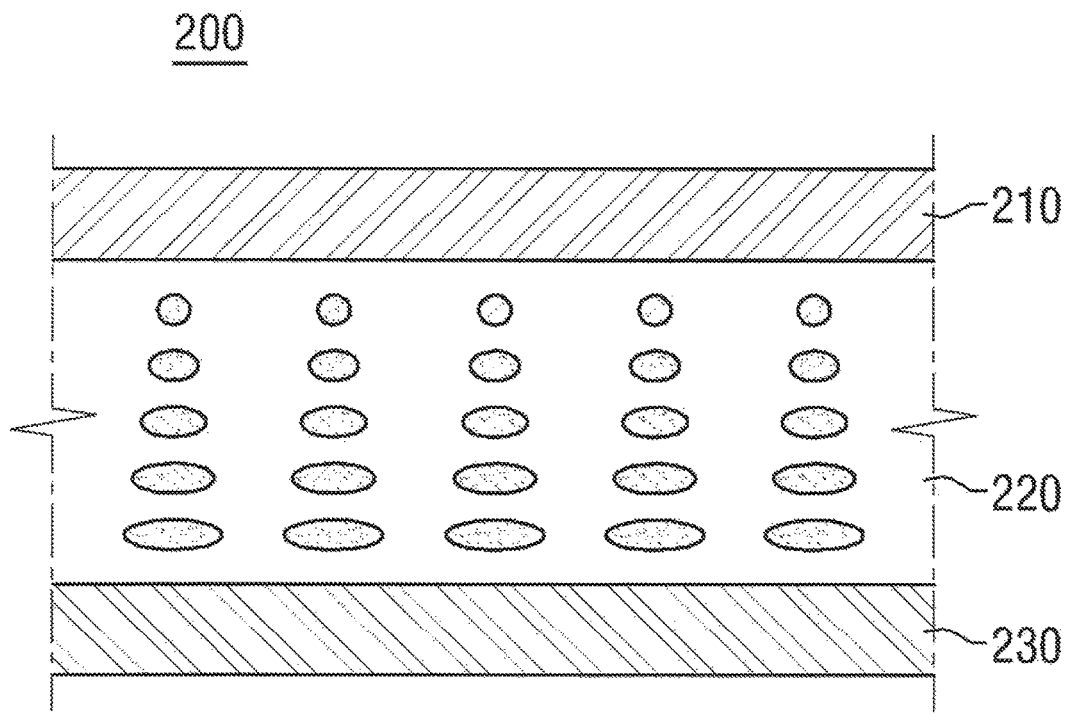
FIG. 4 is a schematic cross-sectional view of a display panel of the display device of FIG. 3.

FIG. 3 is a schematic cross-sectional view of a display device according to an exemplary embodiment of the invention. FIG. 4 is a schematic cross-sectional view of a display panel of the display device of FIG. 3.

Referring to FIGS. 3 and 4, a display device 1000 may include a display panel 200, a backlight unit 300, a lower polarizing plate 120, which is disposed between the display panel 200 and the backlight unit 300, and an upper polarizing plate 110, which is disposed on a viewing side of the display panel 200.

The display panel 200 may be a liquid crystal display (LCD) panel. The display panel 200 may include a first substrate 210, a second substrate 230, and a liquid crystal layer 220, which is encapsulated between the first substrate 210 and the second substrate 230. The upper polarizing plate 110 may be laminated on one surface (for example, a top surface) of the first substrate 210. The lower polarizing plate 120 may be laminated on a bottom surface of the second substrate 230. In a case in which two polarizing plates, i.e. the upper polarizing plate 110 and the lower polarizing plate 120, are respectively disposed on and below the display panel 200, the transmission axes of the two polarizing plates may be perpendicular or parallel to each other. Either of the polarizing plates 100 or 100-1 described above may be provided as each of the upper polarizing plate 110 and the lower polarizing plate 120.

The first substrate 210 may be a color filter (CF) substrate. Although not specifically illustrated in FIG. 3, the first substrate 210 may include: a transparent substrate, which is formed of a transparent insulating material, such as, for example, glass or plastic; a black matrix, which is provided on the bottom surface of the transparent substrate to prevent or substantially prevent light leakage; red, green, and blue color filters; and a common electrode, which is a field-generating electrode formed of a transparent conductive oxide, such as indium tin oxide (ITO) or indium zinc oxide (IZO).

The second substrate 230 may be a thin-film transistor (TFT) substrate. Although not specifically illustrated in FIG. 3, the second substrate 230 may include: a transparent substrate, which is formed of a transparent insulating material, such as, for example, glass or plastic; TFTs, each of which includes a gate electrode, a gate insulating layer, a semiconductor layer, an ohmic contact layer, and source/drain electrodes that are all formed on the transparent substrate; and pixel electrodes, which are field-generating electrodes formed of a transparent conductive oxide such as ITO or IZO.

A transparent plastic substrate, such as, for example, a PET substrate, a polycarbonate (PC) substrate, a polyimide (PI) substrate, a PEN substrate, a polyether sulfone (PES) substrate, a polyarylate (PAR) substrate, or a cycloolefin copolymer (COC) substrate may be used as each of the first substrate 210 and the second substrate 230, but the invention is not limited thereto. The first substrate 210 and the second substrate 230 may be formed of a flexible material.

The liquid crystal layer 220 may be of a twisted nematic (TN) mode having liquid crystal molecules with positive dielectric anisotropy or of a vertical alignment (VA) mode or a horizontal alignment mode (such as in-plane switching (IPS) or fringe field switching (FFS)) having liquid crystal molecules with negative dielectric anisotropy.

FIG. 4 illustrates an example in which the liquid crystal layer 220 is of the TN mode, but the invention is not limited to this example. Referring to FIG. 4, in the absence of an electric field in the liquid crystal layer 220 due to the absence of a voltage difference between the pixel electrodes and the common electrode, i.e., the field-generating electrodes, the liquid crystal molecules of the liquid crystal layer 220 may be aligned so as for their long axes to be in parallel to the surfaces of the first substrate 210 and the second substrate 230 and may be spirally twisted by 90° from the first substrate 210 to the second substrate 230.

Due to a retardation caused by the refractive anisotropy of the liquid crystal molecules, linearly polarized light may be changed, passing through the liquid crystal layer 220. By adjusting the dielectric anisotropy ($\Delta\varepsilon$) and the chiral pitch of the liquid crystal molecules and the thickness of the liquid crystal layer 220 (i.e. the cell gap of the display device 1000), the linear polarization direction of light passing through the liquid crystal layer 200 may be made to rotate by 90°.

The backlight unit 300 may include a light source, a light guide plate, and a reflective layer. The backlight unit 300 may be classified into a direct type, a side light type, or a surface light source type according to the structure thereof.

Example 1

A PVA film (thickness: 30 μm, polymerization degree: 2400, saponification degree: 99.0% or higher, VF-PE3000 manufactured by Kuraray Co., Ltd.) was swollen in an aqueous solution at a temperature 25° C. and was dyed in a dyeing bath at a temperature of 30° C. The dyed PVA film was additionally stretched to a final stretching ratio of 6 times in a boric acid solution at a temperature of 55° C. The additionally-stretched PVA film was dried in a chamber at a temperature of 50° C. for three minutes, thereby preparing a polarizer having a thickness of 12 μm.

A PET film (in-plane retardation (Re): 10700, TA044 manufactured by Toyobo Co., Ltd., thickness: 80 μm) was UV-cured and was laminated onto the prepared polarizer using an adhesive, thereby fabricating a polarizing plate.

Example 2

A PET film (in-plane retardation (Re): 13000, TA015 manufactured by Toyobo Co., Ltd., thickness: 100 μm) was UV-cured and laminated onto the polarizer of Example 1 using an adhesive, thereby fabricating a polarizing plate.

Example 3

A PVA film (thickness: 60 μm, polymerization degree: 2400, saponification degree: 99.0% or higher, VF-PS6000 manufactured by Kuraray Co., Ltd.) was swollen in an aqueous solution at a temperature 25° C. and was dyed in a dyeing bath at a temperature of 30° C. The dyed PVA film was additionally stretched to a final stretching ratio of 6 times in a boric acid solution at a temperature of 55° C. The additionally-stretched PVA Film was dried in a chamber at a temperature of 50° C. for three minutes, thereby preparing a polarizer having a thickness of 22 μm.

A PET film (in-plane retardation (Re): 11500, TA044 manufactured by Toyobo Co., Ltd., thickness: 80 μm) was UV-cured and laminated onto the prepared polarizer using an adhesive, thereby fabricating a polarizing plate.

Comparative Example 1

A TAC film (in-plane retardation (Re): 2, KC8UX manufactured by Konica Minolta, Inc., thickness: 80 μm) was UV-cured and laminated onto the polarizer of Example 1 using an adhesive, thereby fabricating a polarizing plate.

Comparative Example 2

A TAC film (in-plane retardation (Re): 3, KC8UX manufactured by Konica Minolta, Inc., thickness: 80 μm) was UV-cured and laminated onto the polarizer of Example 3 using an adhesive, thereby fabricating a polarizing plate.

Comparative Example 3

A PET film (in-plane retardation (Re): 6000, A4100 manufactured by Toyobo Co., Ltd., thickness: 100 μm) was UV-cured and laminated onto the polarizer of Example 1 using an adhesive, thereby fabricating a polarizing plate.

Experimental Example

The polarizer protective films of Examples 1 through 3, the polarizer protective films of Comparative Examples 1 through 3, the polarizing plates of Examples 1 through 3, and the polarizing plates of Comparative Examples 1 through 3 were cut, thereby preparing samples each having a width of 10 mm and a length of 80 mm. Both ends, in a lengthwise direction, of each of the samples were fixed to a tensile modulus measuring device (i.e. TA.XT Plus), and 10 minutes later, the tensile strength of each of the samples was measured at a temperature of 105° C. The results of this experimental example are as shown in Table 1 below.

What is claimed is:

1. A polarizing plate comprising:
    a bonding layer;
    a polarizer on a first surface of the bonding layer; and
    a polarizer protective film on a second surface of the bonding layer,
    wherein a ratio ($\beta_1/\alpha_3$) of a measured tensile modulus ($\beta_1$), in a transverse direction (TD), of the polarizing plate to a sum ($\alpha_3$) of a measured thickness ($\alpha_1$) of the polarizer and a measured thickness ($\alpha_2$) of the polarizer protective film is greater than 0.27 and less than 0.50, and a ratio ($\beta_2/\beta_3$) of a measured tensile modulus ($\beta_2$), in the TD, of the polarizer to a measured tensile modulus ($\beta_3$), in the TD, of the polarizer protective film is greater than 0 and less than 0.2.

2. The polarizing plate of claim 1, wherein the measured tensile modulus ($\beta_2$), in the TD, of the polarizer is from 1 MPa to 5 MPa.

3. The polarizing plate of claim 1, further comprising:
    an adhesive layer,
    wherein the polarizer is between the adhesive layer and the bonding layer.

4. The polarizing plate of claim 1, wherein the polarizer protective film comprises a base film, and a primer layer on one or both surfaces of the base film and having a transmissivity of 90% or higher at a wavelength of 550 nm and a ratio (B/A) of a refractive index (B) of the primer layer to a refractive index (A) of the base film from 0.69 to 0.95.

5. The polarizing plate of claim 4, wherein the refractive index (A) of the base film is from 1.3 to 1.7, and the refractive index (B) of the primer layer is from 1.0 to 1.6.

6. The polarizing plate of claim 4, wherein a thickness of the primer layer is from 1 nm to 200 nm.

7. The polarizing plate of claim 4, wherein the primer layer comprises a compound of at least one of polyester and an acrylic resin.

8. The polarizing plate of claim 4, wherein the base film has a ratio (Rth/Re) of a retardation in thickness direction (Rth) to an in-plane retardation (Re) of the base film at the wavelength of 550 nm of 1.3 or less, and the in-plane retardation (Re) of the base film and the retardation in thickness direction (Rth) of the base film are calculated by Equations (1) and (2), respectively:

$$Re = (nx - ny) \times d \quad (1); \text{ and}$$

$$Rth = ((nx + ny)/2 - nz) \times d \quad (2),$$

TABLE 1

| | Thickness (μm) | | | Tensile Modulus in TD (MPa) | | | Ratio | | Number of |
| | Polarizer | Polarizer protective film | Sum | Polarizing plate | Polarizer | Polarizer protective film | | | cracks in MD |
| | ($\alpha_1$) | ($\alpha_2$) | ($\alpha_3$) | ($\beta_1$) | ($\beta_2$) | ($\beta_3$) | $\beta_1/\alpha_3$ | $\beta_2/\beta_3$ | |
| Example 1 | 12 | 80 (Re: 10700) | 92 | 40 | 5 | 35 | 0.43 | 0.14 | 0 |
| Example 2 | 12 | 100 (Re: 13000) | 112 | 37 | 5 | 32 | 0.33 | 0.16 | 0 |
| Example 3 | 22 | 80 (Re: 11500) | 102 | 38 | 3 | 35 | 0.37 | 0.09 | 0 |
| Comparative Example 1 | 12 | 80 (Re: 2) | 92 | 20 | 5 | 15 | 0.22 | 0.33 | 3 |
| Comparative Example 2 | 22 | 80 (Re: 3) | 102 | 18 | 3 | 15 | 0.18 | 0.20 | 2 |
| Comparative Example 3 | 12 | 100 (Re: 6000) | 112 | 30 | 5 | 25 | 0.27 | 0.20 | 2 | where nx, ny, and nz denote a refractive index, in an x-axis direction, a refractive index, in a y-axis direction, and a refractive index, in a z-axis direction, respectively, of the base film at the wavelength of 550 nm, d denotes a thickness of the base film, and the x-axis direction, the y-axis direction, and the z-axis direction are a widthwise direction, a lengthwise direction, and a thickness direction, respectively, of the base film.

9. The polarizing plate of claim 4, wherein the base film has an in-plane retardation (Re) from 10,100 nm to 15,500 nm and a value of Nz from 1.5 to 1.7, and the in-plane retardation (Re) and the value of Nz of the base film are calculated by Equations (1) and (3), respectively:

$$Re = (nx-ny) \times d \qquad (1); \text{ and}$$

$$Nz = (nx-nz)/(nx-ny) \qquad (3),$$

where nx, ny, and nz denote a refractive index, in an x-axis direction, a refractive index, in a y-axis direction, and a refractive index, in a z-axis direction, respectively, of the base film at the wavelength of 550 nm, d denotes a thickness of the base film, and the x-axis direction, the y-axis direction, and the z-axis direction are a widthwise direction, a lengthwise direction, and a thickness direction, respectively, of the base film.

10. A display device comprising:
a display panel; and
the polarizing plate of claim 1, the polarizing plate being arranged on a surface of the display panel.

11. The display device of claim 10, further comprising another of the polarizing plate of claim 1, the another polarizing plate being arranged on another surface of the display panel.

12. The display device of claim 10, wherein the display panel comprises a liquid crystal display (LCD) panel comprising a liquid crystal layer between transparent substrates.

13. The polarizing plate of claim 1, wherein the polarizer is a polyvinyl alcohol (PVA)-based film dyed with iodine or a dichroic dye, and the polarizer protective film has an in-plane retardation (Re) from 10,100 nm to 15,500 nm and a value of Nz from 1.5 to 1.7, and the in-plane retardation (Re) and the value of Nz of the polarizer protective film are calculated by Equations (1) and (3), respectively:

$$Re = (nx-ny) \times d \qquad (1); \text{ and}$$

$$Nz = (nx-nz)/(nx-ny) \qquad (3),$$

where nx, ny, and nz denote a refractive index, in an x-axis direction, a refractive index, in a y-axis direction, and a refractive index, in a z-axis direction, respectively, of the polarizer protective film at a wavelength of 550 nm, d denotes a thickness of the polarizer protective film, and the x-axis direction, the y-axis direction, and the z-axis direction are a widthwise direction, a lengthwise direction, and a thickness direction, respectively, of the polarizer protective film.

14. The polarizing plate of claim 13, wherein the polarizer protective film has a value of (nx−ny) from 0.1 to 0.2.

15. The polarizing plate of claim 13, wherein the polarizer protective film is a polyethylene terephthalate (PET)-based film.

16. The polarizing plate of claim 13, wherein the measured tensile modulus ($\beta_3$), in the TD, of the polarizer protective film is not less than 30 MPa and less than 100 MPa.

17. The polarizing plate of claim 13, wherein a water vapor transmission rate (WVTR) of the polarizer protective film at a temperature of 40° C. and a relative humidity of 90% is from 1 g/m²·day to 100 g/m²·day.

18. The polarizing plate of claim 17, wherein the WVTR is from 1 g/m²·day to 10 g/m²·day.

* * * * *